United States Patent [19]

Weber et al.

[11] Patent Number: 4,817,112

[45] Date of Patent: Mar. 28, 1989

[54] LOW COST RING LASER ANGULAR RATE SENSOR

[75] Inventors: Mark W. Weber, Elk River; Harry Gustafson, Minneapolis, both of Minn.

[73] Assignee: Honeywell Inc., Minneapolis, Minn.

[21] Appl. No.: 733,279

[22] Filed: May 10, 1985

[51] Int. Cl.$^4$ .............................................. H01S 3/083
[52] U.S. Cl. ...................................... 372/94; 356/350
[58] Field of Search ....................... 372/94, 61, 33, 87, 372/88, 29, 32; 356/350

[56] References Cited

U.S. PATENT DOCUMENTS

| | | | |
|---|---|---|---|
| 3,904,986 | 9/1975 | Hernqvist | 372/88 |
| 3,997,385 | 11/1976 | Fein et al. | 372/87 |
| 4,007,431 | 2/1977 | Abbink et al. | 372/94 |
| 4,063,803 | 12/1977 | Wright et al. | 372/103 |
| 4,142,958 | 3/1979 | Wei et al. | 204/192 P |
| 4,153,317 | 5/1979 | Ljung et al. | 372/107 |
| 4,203,080 | 5/1980 | Wright et al. | 372/107 |
| 4,233,568 | 11/1980 | Hamerdinger et al. | 372/107 |
| 4,352,185 | 9/1982 | Crane | 372/29 |
| 4,525,028 | 6/1985 | Dorschner | 350/377 |
| 4,554,667 | 11/1985 | Kaminski | 372/87 |
| 4,561,780 | 12/1985 | Ljung et al. | 356/350 |
| 4,595,377 | 6/1986 | Norvell | 372/87 |
| 4,612,647 | 9/1986 | Norvell | 372/94 |

FOREIGN PATENT DOCUMENTS

85/03568 8/1985 European Pat. Off. ............ 356/350

OTHER PUBLICATIONS

Shimadu et al., "Toshiba Glass-Sealed He-Ne Laser Tubes"; Toshiba Review No. 105, Sep.-Oct. 1976.
"Alumina/Silica Multilayer Coatings for Excimer Lasers", by S. R. Foltyn et al., Nov. 1983.
"Ion-Beam-Assisted Deposition of Optical Films", by R. P. Netterfield.
"Molecular Bonding in Optical Films Deposited by Ion-Beam Sputtering", by C. Y. She, May, 1985.
"Recent Developments in Reactively Sputtered Optical Thin Films", by W. T. Pawlewicz et al., 1982.
"Thermal Stability Studies of Sputter-Deposited Multilayer Selective Absorber Coatings", by J. A. Thornton et al, Electronics and Optics 1982.

*Primary Examiner*—Léon Scott, Jr.
*Attorney, Agent, or Firm*—Robert A. Pajak

[57] ABSTRACT

A ring laser angular rate sensor is constructed from a solid glass block with lasing paths machined therein and mirrors joined to the block with a frit seal.

16 Claims, 2 Drawing Sheets

LOW COST RING LASER ANGULAR RATE SENSOR

BACKGROUND OF THE INVENTION

This invention relates to a novel construction for a ring laser angular rate sensor and more particularly to a construction which is less costly to manufacture than prior art constructions.

After years of development, ring laser angular rate sensors, commonly referred to as ring laser gyros, have become commercially successful products and are rapidly replacing conventional mechanical angular rate sensors in many applications. Today, most commercial ring laser angular rate sensors use a mechanically and thermally stable block construction and mechanical dither concepts taught in U.S. Pat. Nos. 3,390,606; 3,467,472; and 3,373,650.

These prior art ring laser angular rate sensors have proven highly satisfactory in operation and as previously mentioned are rapidly gaining widespread acceptance for certain applications. These prior art ring laser angular rate sensors, however, are costly to manufacture.

SUMMARY OF THE INVENTION

An object of this invention is the provision of a novel construction for a ring laser angular rate sensor which permits it to be inexpensively manufactured.

Another object of the invention is the provision of a ring laser angular rate sensor whose overall size, including its dither motor, is extremely small—e.g., less than 2 inches in diameter.

Briefly, this invention contemplates the provision of a ring laser angular rate sensor constructed from a solid glass block with lasing paths machined therein and mirrors joined to the block with a thermally formed hermetic seal. A refocussing mirror with a short radius of curvature in combination with a short path length are features of this novel construction.

DESCRIPTION OF THE INVENTION

Figure 1:
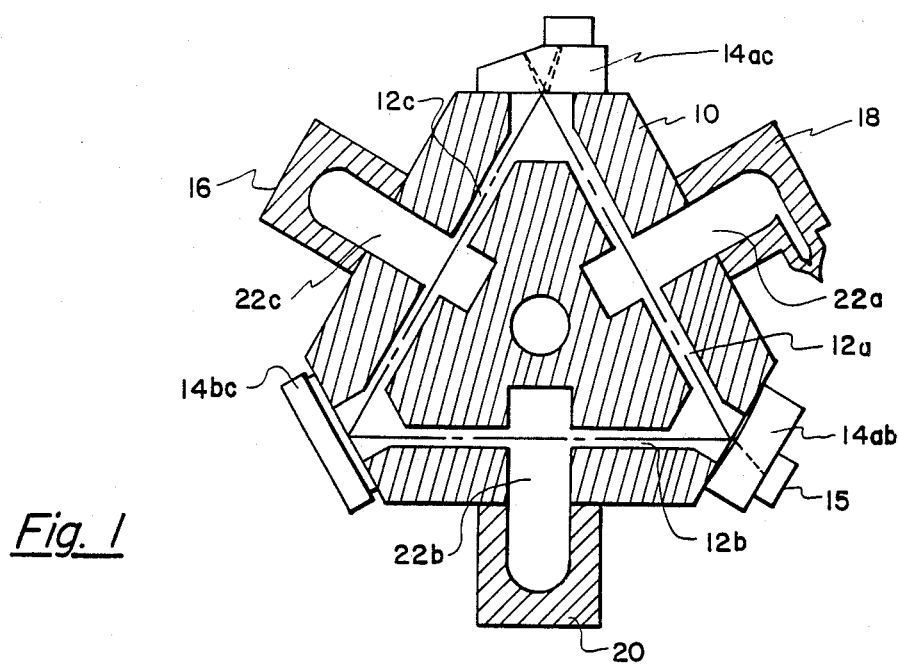
FIG. 1 is a plan view—with parts in section—of a ring laser angular rate sensor constructed in accordance with the teaching of this invention.

Referring now to FIG. 1, a silicate glass block 10, more particularly a borosilicate, preferably BK-7 (letter number combinations are Schott Optical commercial designations), has bores 12a, 12b, and 12c machined therein to form a triangular lasing cavity.

Mirrors 14ac; 14ab; and 14bc are attached to the block at the intersection of the paths 12. It will be appreciated that ring laser angular rate sensors with a rectangular lasing cavity or other cavity configurations, including a cubic cavity, can be constructed in accordance with the teaching of this invention.

The mirrors and how they are attached to the block 10 will be described in detail hereinafter. Each of the mirrors perform functions in addition to redirecting the laser beam; mirror 14ac is partially transmissive for providing a readout beam signal; mirror 14ab is curved and focuses the counter-rotating laser beams, and mirror 14bc controls the cavity path length. A sensor 15 attached to mirror 14ab provides path length control signals to mirror 14bc as in prior art ring laser angular rate sensors. A suitable readout device for use in combination with mirror 14ac is disclosed in copending application entitled, "Readout for Ring Laser Angular Sensors", by Killpatrick.

An anode 16 and a pair of cathodes 18 and 20 are fixed to the block 10 and will be described in greater detail in connection with FIG. 4. As will be appreciated by those skilled in the art, these electrodes couple electrical energy into a gas which fills the cavities and generates the counter-rotating laser beams.

There are cylindrical passages 22a, 22b, and 22c machined into the block 10 where the cathodes and anode are attached to the block. These passages allow the lasing gas to communicate with the interior surfaces of the cathodes and anode. Advantageously, the bores 22a, 22b, and 22c extend into the block beyond the paths in order to provide reservoirs to increase the total gas volume of the system.

There is a bore 26 entirely through the block 10 in a direction perpendicular to the plane formed by the paths 12. This passage may be used to accommodate a compact dither motor preferably disclosed in a copending application entitled, "A Dither Suspension Mechanism for a Ring Laser Angular Rate Sensor", filed on even date, May 10, 1985, by Killpatrick.

Although the construction of the ring laser angular rate sensor in accordance with the teaching of the invention is novel, it's basic operating principle is the same as those of prior art ring laser angular rate sensors. Briefly, the cavities within the block 10 are filled with a lasing gas of helium neon mixture. An electric field between the anode 16 and the cathodes 18 an 20 establishes counter-rotating laser beams within the passages 12 in the block 10. Rotation of the block 10 causes the frequency of one of the counter-rotating beams to increase, and the other to decrease. The frequency difference is detected by a suitable sensor mounted to mirror 14ac. The photodetector output signals are processed in a suitable manner well understood by those skilled in the art.

Figure 2:
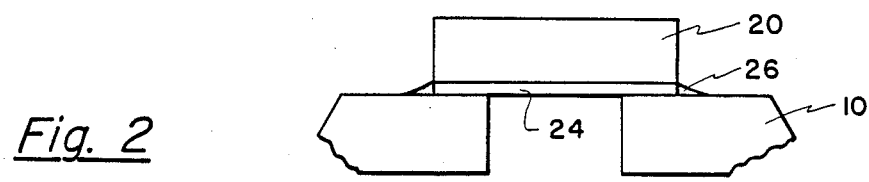
FIG. 2 is a partial sectional view showing detail of a mirror sealed to the ring laser angular rate sensor block.

Referring now to FIG. 2, an important contributor to reducing the construction cost in accordance with the teaching of this invention is the use of a frit seal between the mirror 14 and the solid block 10 in place of the optical contacts generally used in prior art ring laser angular rate sensors. In the preferred embodiment of the invention, the ring laser angular rate sensor block 10 is a solid block of BK-7 glass into which the lasing paths are machined, as previously explained. A substrate 22 for each mirror is also formed from BK-7 glass. A laser reflective coating 24 is formed on the surface of the substrate 22 in a suitable manner known to those skilled in the art. A coating comprised of a layer of titanium dioxide and a layer of silicon dioxide is suitable.

The choice of material for the solid block 10, the substrate 22, and the coating 24 is dictated by the need to have compatible coefficients of expansion for the solid block 10, the substrate 22, and the coating 24. With compatible coefficients of expansion a thermally formed frit sealing process can be used to join the substrate 22 to block 10. As will be appreciated by those skilled in the art, the frit seal is formed with a soldered glass or frit material 26 in a process in which temperatures are raised to the range of 450°–500° C. for a substantial period of time, emphasizing the need for each of the parts to have a compatible temperature coefficient of expansion.

Figure 3:
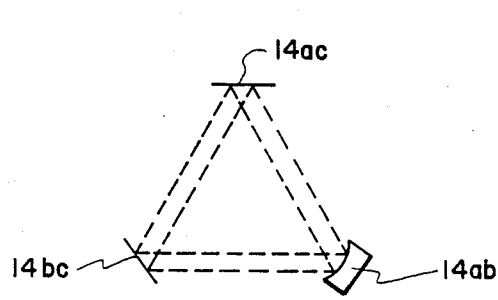
FIG. 3 is a schematic view of the laser cavity and the curved focussing mirror.

Referring now to FIG. 3, flat mirrors 14bc and 14ac, and a curved mirror 14ab circulate the counter-rotating beams in the cavity formed by the passages 12ab, 12ac, and 12bc machined into the block 10. The cavity confines the laser beam, stabilizes it against angular distortion of the block, and forces the laser to oscillate in a singular transverse mode. The diameter of the laser gain fuse should be chosen as to provide gain and intercavity aperture to discriminate against off-access modes. A gain tube diameter of 0.030 inches has proven satisfactory.

It is important that a ring laser angular rate sensor constructed in accordance with the teaching of this invention have a short cavity. Applicants have determined that a cavity of approximately 2.4 inches is satisfactory. A cavity in excess of six inches in length would ordinarily be impractical.

The focussing mirror 14ab has a curved reflecting surface with a short radius of curvature. As the radius of curviture of the mirror 14ab decreases, the amount of misalignment in the cavity which can be tolerated increases to a limit where the radius equals the path length. Beyond this, i.e., radius less than the cavity length, the lasing beams become unstable.

In a preferred embodiment of the invention, the radius of curvature of mirror 14ab is 15 cm to 20 cm with a cavity length of about 6 cm. The radius can vary as the cavity length varies with the range of an inner limit equal to the path length and an outer limit of six times the path length.

Figure 4:
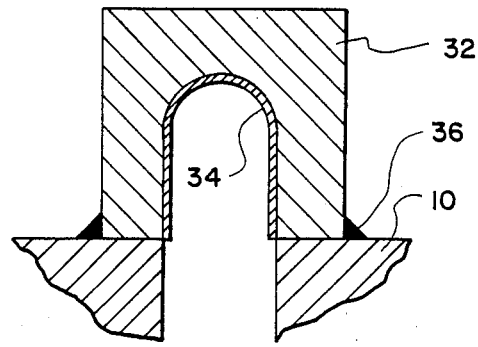
FIG. 4 is a partial sectional view illustrating the construction of the laser electrodes.

Referring now to FIG. 4, as in the prior art devices, the electrodes provide an electrical connection to the laser gas. Each of the electrodes, one anode and two cathodes, is made to match the thermal coefficient of expansion of the block 10. This enables the use of a thermal bonding process to affix the electrodes to the block 10 and provide a hermetic seal there between. To these ends a base 32 made from nickle-iron alloy and its intersurface is coated with a thin layer of aluminum 34. The ratio of Ni to Fe can be adjusted so that this Invar type material has a thermal coefficient of expansion which is compatible with the thermal coefficient of the block 10. To match a BK-7 block, a mixture of about Ni-49%, Fe-50% and 1% materials to improve machinery, etc., is satisfactory. It should be noted that the walls of the electrode should be thin to provide flexibility where the electrode is attached to the block 10. This construction compensates for any relative movement between the block and the electrode due to thermally or mechanically induced stress.

Figure 5:
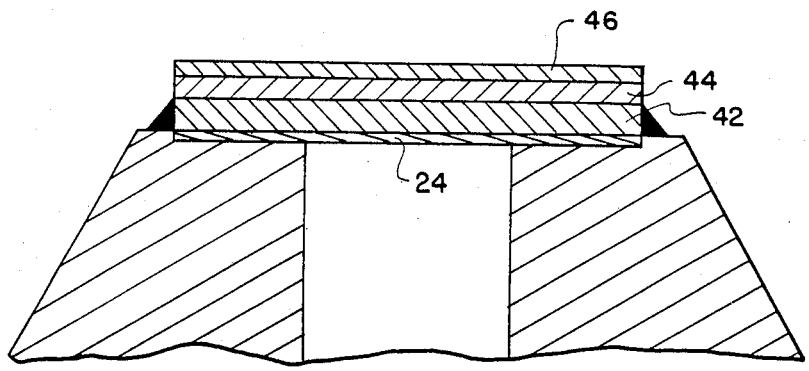
FIG. 5 is a detailed sectional view of a single, novel path length control device useful in the practice of applicants' invention.

Referring now to FIG. 5, as in the prior art, a path length control mirror maintains the length of the cavity at an integral number of wave lengths in accordance with the techniques known to those skilled in the art. However, the construction of the path length control mirror shown in FIG. 5 is novel and advantageous as it is dramatically simple and more straightforward then those employed in the prior art.

The novel path length control comprises a substrate 42 with reflective coating 24 affixed to the block 10 all in the manner described in connection with FIG. 2 with a KB-7 block 10 and a BK-7 substrate 42. The substrate 42 is relatively thin e.g., 0.020 inches thick, in a preferred embodiment. Bonded to the mirror substrate 42 are to piezoelectric wafers 44 and 46. As will be appreciated by those skilled in the art, the orientation of the wafers 44 and 46 relative to one another is such as to cancel the effect of temperature changes. Each of the wafers are preferably ½ the thickness of the mirror substrate.

Figure 6:
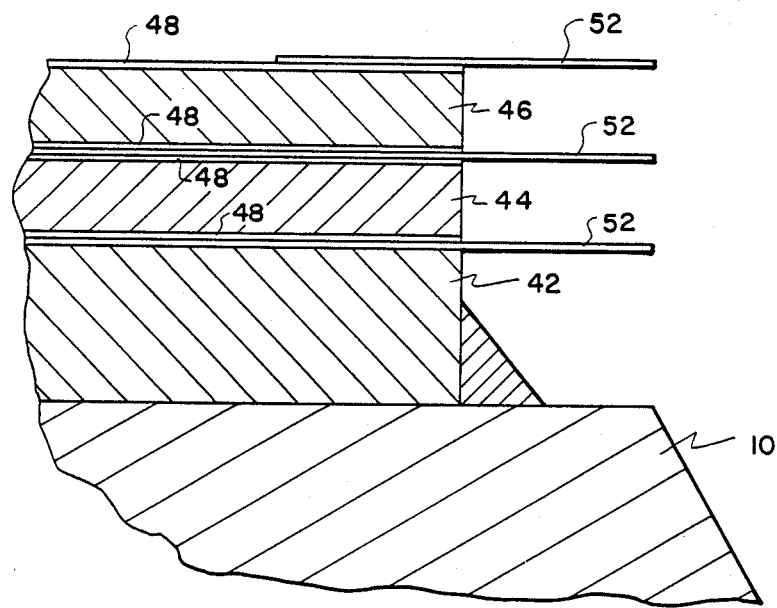
FIG. 6 is an enlarged, detail view of the structure of FIG. 5.

Referring now to FIG. 6 as well as FIG. 5, a conductive electrode 48 is deposited over the entire upper and lower surface of each of the piezoelectric wafers 44 and 46. The lower wafer 44 is bonded to mirror substrate 42 with a suitable epoxy, and similarly the upper wafer 46 is epoxy bonded to the lower wafer 44. Conductive tabs 52 are attached to the electrode surfaces and permitted appropriate signals to be coupled to the piezoelectric crystals in order to deflect the mirror substrate and thus alter the path length so that the path length is an integral number of wavelengths.

Those skilled in the art will recognize that only preferred embodiments of the present invention is disclosed herein and that the embodiment may be altered and modified without departing from the true spirit and scope of the invention as defined in the accompanying claims.

A compact mechanical dither motor particularly well suited in combination with the novel ring laser angular rate sensor disclosed herein, is disclosed in a copending application entitled, "A Dither Suspension Mechanism for a Ring Laser Angular Rate Sensor", filed on even date, May 10, 1985, by Hanse, et.al., and assigned to the same assignee of this invention.

What is claimed is:

1. A ring laser angular rate sensor in which counter-rotating laser beams propagate, comprising in combination:
    a block comprised of a borosilicate glass;
    a plurality of intersecting bores in said block;
    a plurality of mirrors each comprised of a reflective coating on a substrate;
    each of said mirrors affixed to said block with a frit seal bonding together said substrate and said block, and each one of said mirrors being located at an intersection of a pair of said bores forming a closed loop resonant cavity within said block; and
    said block, said substrate, and said coating having compatible thermal coefficients of expansion.

2. A ring laser angular rate sensor in which counter-rotating laser beams propagate as in claim 1, wherein said bores are machined into said block.

3. A ring laser angular rate sensor in which counter-rotating laser beams propagate as in claim 1, wherein said borosilicate glass is BK-7.

4. A ring laser angular rate sensor in which counter-rotating laser beams propagate, comprising in combination:
    a block comprised of a borosilicate glass;
    a plurality of intersecting bores in said block;
    a plurality of mirrors each comprised of a reflective coating on a substrate;
    each of said mirrors affixed to said block with a frit seal bonding together said substrate and said block, and each one of said mirrors being located at an intersection of a pair of said bores forming a closed loop resonant cavity within said block;

said block, said substrate, and said coating having compatible thermal coefficients of expansion; and one of said mirrors having a reflective surface with a radius of curvature sufficient to stably focus said laser beams.

5. A ring laser angular rate sensor in which counter-rotating laser beams propagate as in claim 4, wherein said radius of curvature is in a range of one to six times the length of said cavity.

6. A ring laser angular rate sensor in which counter-rotating laser beams propagate as in claim 5, wherein said cavity length is less than six inches.

7. A ring laser angular rate sensor in which counter-rotating laser beams propagate as in claim 4, wherein said bores are machined into said block.

8. A ring laser angular rate sensor in which counter-rotating laser beams propagate as in claim 4, wherein said borosilicate glass is BK-7.

9. A ring laser angular rate sensor in which counter-rotating laser beams propagate, comprising in combination;

a block comprised of a borosilicate glass;

a plurality of intersecting bores in said block;

a plurality of mirrors each comprised of a reflective coating on a substrate;

each of said mirrors affixed to said block with a frit seal bonding together said substrate and said block, and each one of said mirrors being located at an intersection of a pair of said bores forming a closed loop resonant cavity within said block;

one of said mirrors having a reflective surface with a radius of curvature sufficient to stably focus said laser beams;

a plurality of electrodes each comprised of a base with an interior aluminum coating, said base of each one of said electrodes bonded to said block with a frit seal; and said block, said base, said substrate, and said reflective coating having compatible thermal coefficients of expansion.

10. A ring laser angular rate sensor in which counter-rotating laser beams propagate, comprising in combination:

a block comprised of a borosilicate glass;

a plurality of intersecting bores in said block;

a plurality of mirrors each comprised of a reflective coating on a substrate;

each of said mirrors affixed to said block with a frit seal bonding together said substrate and said block, and each one of said mirrors being located at an intersection of a pair of said bores forming a closed loop resonant cavity within said block;

said block, said substrate, and said reflective coating having compatible thermal coefficients of expansion; and a piezoelectric crystal bonded to the surface of the substrate of another of said mirrors, said piezoelectric crystal having a conductive coating thereon for coupling an electrical signal to said piezoelectric crystal in order to deflect said substrate and after the path length of said cavity.

11. A ring laser angular rate sensor in which counter-rotating laser beams propagate, comprising in combination:

a block comprised of a borosilicate glass;

a plurality of intersecting bores in said block;

a plurality of mirrors each comprised of a reflective coating on a substrate;

each of said mirrors affixed to said block with a frit seal bonding together said substrate and said block, and each one of said mirrors being located at an intersection of a pair of bores forming a closed loop resonant cavity within said block;

one of said mirrors having a reflective surface with a radius of curvature sufficient to stably focus said laser beams;

said block, said substrate, and said reflective coating having compatible thermal coefficients of expansion; and a piezoelectric crystal bonded to the surface of the substrate of another of said mirrors, said piezoelectric crystal having a conductive coating thereon for coupling an electrical signal to said piezoelectric crystal in order to deflect said substrate and alter the path length of said cavity.

12. A ring laser angular rate sensor in which counter-rotating laser beams propagate, comprising in combination:

a block comprised of a borosilicate glass;

a plurality of intersecting bores in said block;

a plurality of mirrors each comprised of a reflective coating on a substrate;

each of said mirrors affixed to said block with a frit seal bonding together said substrate and said block, and each one of said mirrors being located at an intersection of a pair of said bores forming a closed loop resonant cavity within said block;

one of said mirrors having a reflective surface with a radius of curvature sufficient to stably focus said laser beams;

said block, said base, said substrate, and said reflective coating having compatible thermal coefficients of expansion; and a piezoelectric crystal bonded to the surface of the substrate of another of said mirrors, said piezoelectric crystal having a conductive coating thereon for coupling an electrical signal to said piezoelectric crystal in order to deflect said substrate and alter the path length of said cavity.

13. A method of making a ring laser angular rate sensor comprising:

boring a plurality of intersecting bores in a block of borosilicate glass;

affixing a mirror to said block with a frit seal, said mirrors being affixed to said block at each of said intersecting bores in said block to form a closed-loop resonant cavity within said block.

14. The method of claim 13 further comprising the step of affixing at least one electrode to said block by a frit seal.

15. The method of claim 13 wherein said cavity length is less than six inches.

16. The method of claim 13 wherein said borosilicate glass is BK-7.

* * * * *